(12) United States Patent
Park et al.

(10) Patent No.: US 9,744,709 B2
(45) Date of Patent: Aug. 29, 2017

(54) VARIABLE EXTRUSION DIE APPARATUS

(71) Applicant: HYUNDAI MOTOR COMPANY, Seoul (KR)

(72) Inventors: Hyung Soo Park, Seoul (KR); Jae Hoon Choi, Busan (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 113 days.

(21) Appl. No.: 14/709,404

(22) Filed: May 11, 2015

(65) Prior Publication Data

US 2016/0167278 A1    Jun. 16, 2016

(30) Foreign Application Priority Data

Dec. 11, 2014   (KR) .................. 10-2014-0178319

(51) Int. Cl.
| | |
|---|---|
| *B29C 47/92* | (2006.01) |
| *B29C 47/00* | (2006.01) |
| *B29C 47/08* | (2006.01) |
| *B29C 47/12* | (2006.01) |

(52) U.S. Cl.
CPC ............ *B29C 47/92* (2013.01); *B29C 47/003* (2013.01); *B29C 47/0033* (2013.01); *B29C 47/0816* (2013.01); *B29C 47/0837* (2013.01); *B29C 47/122* (2013.01); *B29C 47/124* (2013.01); *B29C 2947/92571* (2013.01); *B29C 2947/92904* (2013.01)

(58) Field of Classification Search
CPC ... B29C 47/92; B29C 47/003; B29C 47/0033; B29C 47/0816; B29C 47/0837; B29C 47/124; B29C 47/122; B29C 947/92571; B29C 2947/92904

USPC ................ 425/380–381, 376.1, 465–466; 264/176.1, 177.13, 177.16, 209.2
See application file for complete search history.

(56) References Cited

U.S. PATENT DOCUMENTS

| | | | | |
|---|---|---|---|---|
| 3,327,350 | A | * | 6/1967 | Limbach ............... B29C 47/22 425/381 |
| 3,601,851 | A | * | 8/1971 | Heidinger ............. B29C 47/20 239/455 |
| 3,613,162 | A | * | 10/1971 | Talsma ................. B29C 47/24 425/376.1 |
| 3,663,144 | A | * | 5/1972 | Pendleton ........... A21C 11/166 425/287 |
| RE28,600 | E | | 11/1975 | Lemelson |
| 4,386,903 | A | * | 6/1983 | Wybenga ........... B29C 45/1777 264/328.11 |

(Continued)

FOREIGN PATENT DOCUMENTS

| | | |
|---|---|---|
| JP | 2001-191110 A | 7/2001 |
| JP | 2003-326311 A | 11/2003 |

(Continued)

*Primary Examiner* — Nahida Sultana
(74) *Attorney, Agent, or Firm* — McDermott Will & Emery LLP

(57) ABSTRACT

A variable extrusion die apparatus includes a first die into which an extrusion material is injected. A second die is coupled to the first die and has an extrusion nozzle having a shape corresponding to a cross section of an extrusion product. A swivel core is rotatably installed in the extrusion nozzle, wherein a cross section of the extrusion nozzle is varied by rotation of the swivel core.

10 Claims, 8 Drawing Sheets

(56) References Cited

U.S. PATENT DOCUMENTS

| | | | | |
|---|---|---|---|---|
| 4,525,318 A | * | 6/1985 | Reil | ............... B29C 45/14008 |
| | | | | 264/259 |
| 5,667,745 A | * | 9/1997 | Andersson | ........ B29C 45/14598 |
| | | | | 264/259 |
| 6,470,726 B1 | | 10/2002 | Murata et al. | |
| 2002/0136795 A1 | * | 9/2002 | Wang | ............... B29C 45/5008 |
| | | | | 425/542 |

FOREIGN PATENT DOCUMENTS

| JP | 2010105013 A | 5/2010 |
|---|---|---|
| KR | 10-1165243 B1 | 7/2012 |
| KR | 10-1342690 B1 | 12/2013 |

* cited by examiner

VARIABLE EXTRUSION DIE APPARATUS

CROSS-REFERENCE TO RELATED APPLICATION

This application is based on and claims the benefit of priority to Korean Patent Application No. 10-2014-0178319, filed on Dec. 11, 2014 in the Korean Intellectual Property Office, the disclosure of which is incorporated herein in its entirety by reference.

TECHNICAL FIELD

The present disclosure relates to a variable extrusion die apparatus, and more particularly, to a variable extrusion die apparatus capable of easily molding a product having a variable cross-sectional shape by varying a cross-section of an extrusion nozzle.

BACKGROUND

In general, an extrusion molding method is a one of metal processing methods of putting an extrusion material into a container and pushing the extrusion material using an extrusion nozzle of an extrusion die to manufacture a long product having a constant cross section, and as a material, aluminum having a low melting point, an aluminum alloy, or rubber has been mainly used.

Recently, the extrusion molding using the aluminum material or rubber material as described above has been applied to process a component such as a sash member, a vehicle body, a bumper, or the like, of a vehicle such as a passenger car, a truck, or the like, due to excellent durability and recyclability.

The extrusion molding method as described above may be roughly classified into a forward extrusion method and a backward extrusion method, wherein the forward extrusion method is an extrusion method when a direction of an extruded metal is the same as a direction of pressure applied from the outside, and the backward extrusion method is an extrusion method when the direction of the extruded metal is opposite to the direction of pressure applied from the outside.

In addition, extrusion performed at a high temperature is referred to as hot-extrusion, and extrusion performed at room temperature is referred to as cold-extrusion.

Among them, an extrusion molding method by forward extrusion method will be briefly described. A product having a desired cross-sectional shape may be extrusion-molded by fixing an extrusion die having an extrusion nozzle having a cross-sectional shape to be manufactured to a front end of a container and pressurizing an extrusion material toward the extrusion die by a pressurizer (main ram) to extrude the extrusion material in the extrusion nozzle simultaneously with inserting a heated extrusion material into the container.

That is, since the extrusion nozzle of the extrusion die has a constant cross-sectional shape, the product to be manufactured by extrusion may be molded so as to have a constant cross-sectional shape corresponding to the extrusion nozzle.

As described above, since the cross-sectional shape of the product is the same as the shape of the extrusion nozzle of the extrusion die, a round bar, an angular bar, a section member, a pipe, and other arbitrary products may be manufactured by suitably changing the shape of the extrusion nozzle of the extrusion die.

Meanwhile, at the time of extrusion processing, since there is a need to push the extrusion material made of a metal material or rubber material using the extrusion nozzle, a significantly large amount of force is required, such that tools capable of enduring high temperature and high pressure is required together with large scale mechanical equipment.

However, in the case of the product manufactured by the extrusion processing as described above, since the product has a constant cross-sectional shape and is formed to be long, it is difficult to produce a product of which a cross-sectional shape is variable such as a door frame for a vehicle.

SUMMARY

The present disclosure has been made to solve the above-mentioned problems occurring in the prior art while advantages achieved by the prior art are maintained intact.

First, an aspect of the present disclosure provides a variable extrusion die apparatus capable of easily extrusion-molding a product having a variable cross-section.

Second, another aspect of the present disclosure provides a variable extrusion die apparatus capable of maximally maintaining an existing die to minimize new development and investment.

The technical objects of the present disclosure are not limited to the above-mentioned technical objects, and other technical objects that are not mentioned will be clearly understood by those skilled in the art through the following descriptions.

According to an exemplary embodiment of the present disclosure, a variable extrusion die apparatus includes: a first die into which an extrusion material is injected; a second die coupled to the first die and provided with an extrusion nozzle having a shape corresponding to a cross section of an extrusion product; and a swivel core rotatably installed in the extrusion nozzle to vary a cross section of the extrusion nozzle.

According to another embodiment, a variable extrusion die apparatus may include an extrusion die having an extrusion nozzle having a shape corresponding to a cross section of an extrusion product. A swivel core may be rotatably installed in the extrusion nozzle, wherein a cross section of the extrusion nozzle may be varied by rotation of the swivel core.

Details of embodiments will be described below with reference to the accompanying drawings.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
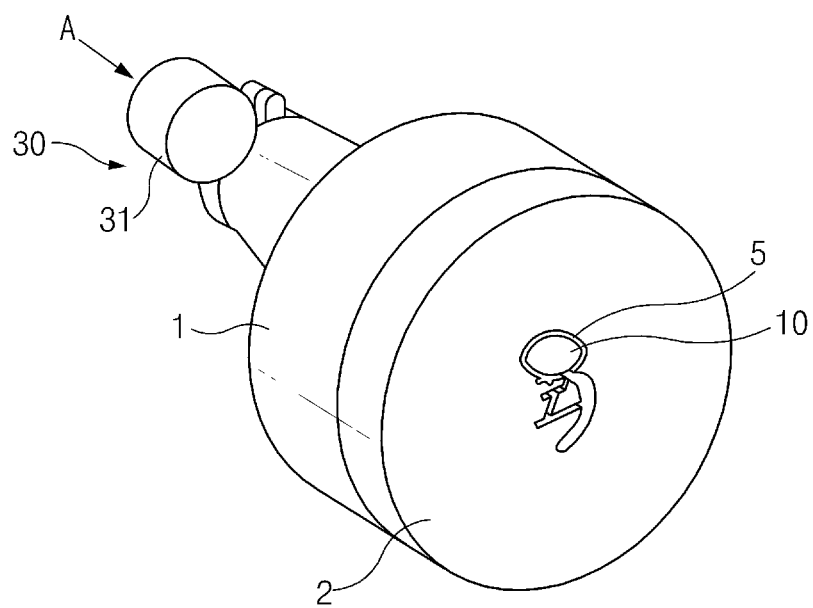
FIG. 1 is a perspective view of a variable extrusion die apparatus according to an exemplary embodiment of the present inventive concept.

Advantages and features of the present inventive concept and methods to achieve them will be elucidated from exemplary embodiments described below in detail with reference to the accompanying drawings.

However, the present inventive concept is not limited to the exemplary embodiment disclosed herein but will be implemented in various forms. The exemplary embodiments make disclosure of the present inventive concept thorough and are provided so that those skilled in the art can easily understand the scope of the present inventive concept. Therefore, the present inventive concept will be defined by the scope of the appended claims. Like reference numerals throughout the specification denote like elements.

Hereinafter, a variable extrusion die apparatus according to exemplary embodiments of the present inventive concept will be described with reference to the accompanying drawings.

Figure 2:
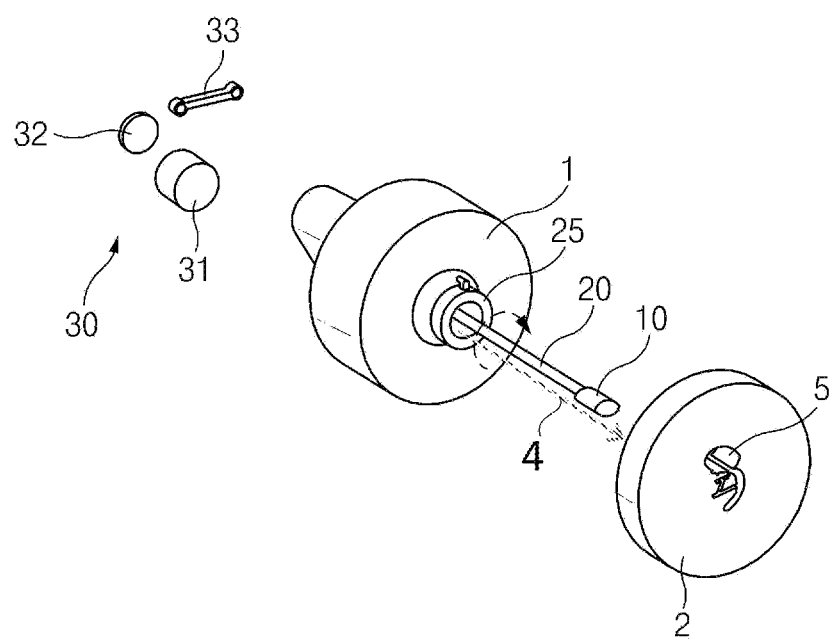
FIG. 2 is an exploded perspective view of the variable extrusion die apparatus according to an exemplary embodiment of the present inventive concept.

Referring to FIGS. 1 to 4, a variable extrusion die apparatus according to an exemplary embodiment of the present inventive concept is configured to include, in certain embodiments, a first extrusion die 1 and a second extrusion die 2 having an extrusion nozzle 5 having a shape corresponding to a cross section of an extrusion product. In certain embodiments, only one extrusion die is present. A swivel core 10 is rotatably installed in the extrusion nozzle 5 of the second extrusion die 2. An extrusion material is injected into the first extrusion die 1. The first die 1 has an injection path 4 through which the extrusion material is injected as illustrated in FIG. 2.

Figure 3:
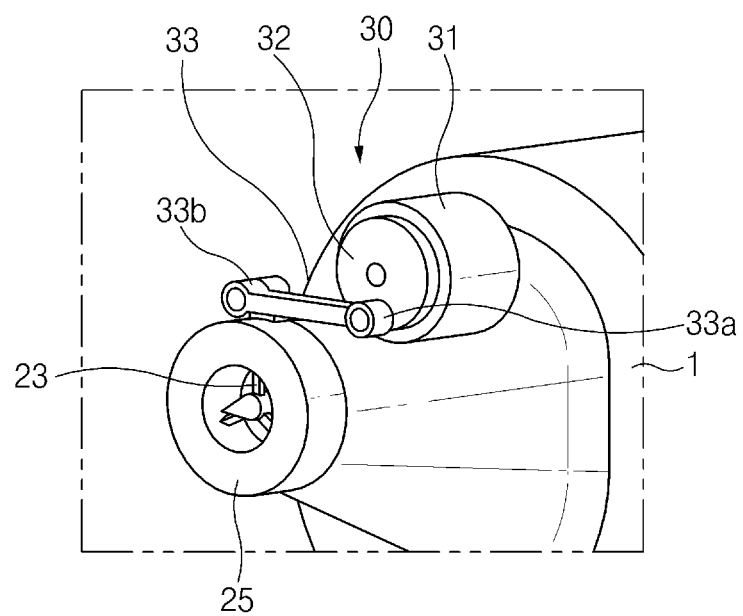
FIG. 3, which is a view illustrating a state viewed in an arrow A direction of FIG. 1, is a view illustrating a core wheel and a controller connected to the core wheel of the variable extrusion die apparatus.
Figure 4:
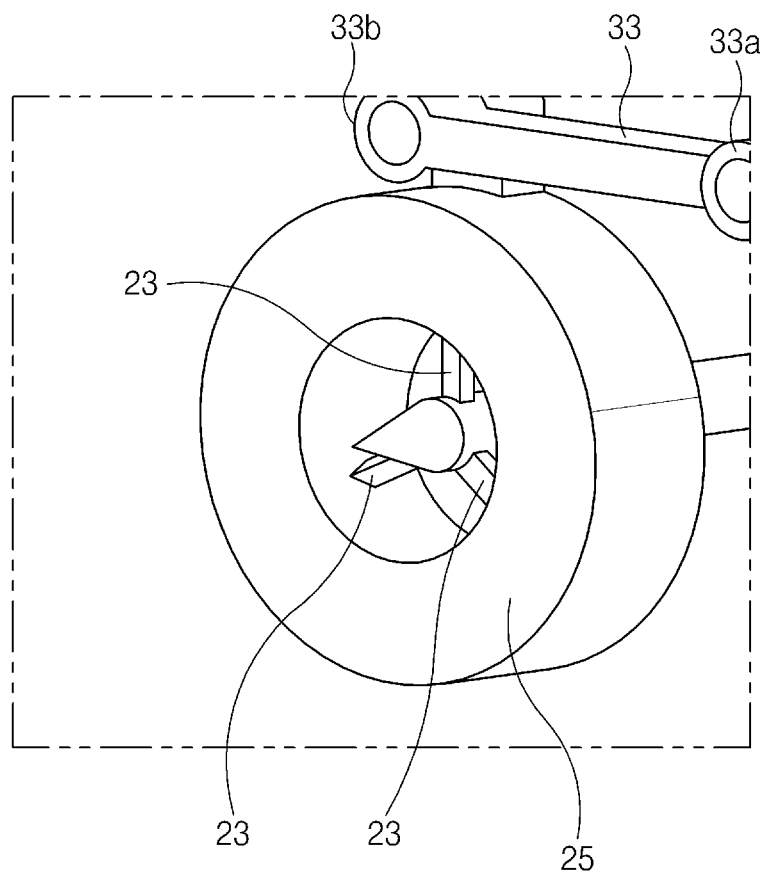
FIG. 4 is an enlarged view of the core wheel and a spoke of FIG. 3.

In certain embodiments, the second die 2 is coupled to one side surface of the first die 1 as illustrated in FIGS. 1 and 2, and a core wheel 25 rotating the swivel core 10 is rotatably installed to the other side surface of the first die 1 as illustrated in FIG. 3. In certain embodiments, a controller 30 is installed adjacently to the core wheel 25, and the controller 30 is configured to adjust a rotation angle by rotating the core wheel 25.

The swivel core 10 is rotatably inserted into the extrusion nozzle 5 and is configured to vary a cross section of the extrusion nozzle 5. In certain embodiments, the swivel core 10 is configured so that an axial direction thereof is to the same as an extrusion direction of the extrusion material.

Further, in certain embodiments, the swivel core 10 is connected to the core wheel 25 via a control shaft 20, and the control shaft 20 passes through the injection path 4 of the first die 1 and is extended toward the extrusion nozzle 5 of the second die 2. One end portion of the control shaft 20 is connected to an inner peripheral surface of the core wheel 25 via a plurality of spokes 23, and the other end portion of the control shaft 20 is connected to the swivel core 10. Therefore, in certain embodiments, as the core wheel 25 is rotated by the controller 30, the control shaft 20 rotates together with the core wheel 25, and the swivel core 10 may rotate in the extrusion nozzle 5 through the rotation of the control shaft 20 in a predetermined direction.

In certain embodiments, the plurality of spokes 23 extend from one end portion of the control shaft 20 in an outer diameter direction, and the extrusion material injected into the injection path 4 flows between the plurality of spokes 23.

According to an exemplary embodiment, the controller 30 may include a motor 31 configured to generate power, a crank 32 configured to be rotated by the motor 31, and a connecting rod 33 connecting the crank 32 and the core wheel 25 as illustrated in FIG. 3.

In certain embodiments, the motor 31 is fixedly installed to the other side surface of the first die 1 so as to be adjacent to the core wheel 25.

The crank 32 may be connected to a rotation shaft of the motor 31 to rotate by power of the motor 31 in a clockwise or counterclockwise direction.

In certain embodiments, one end portion 33a of the connecting rod 33 is rotatably connected to one portion of the crank 32, and the other end portion 33b of the connecting rod 33 is rotatably connected to an outer portion of the core wheel 25. Particularly, as the one end portion 33a of the connecting rod 33 is eccentrically connected to the crank 32, the connecting rod 33 may precisely and stably perform a rotation operation of the core wheel 25 through a link operation.

As the crank 32 rotates by the motor 31 through the controller 30 as described above, the connecting rod 33 performs a predetermined link operation, and the core wheel 25 may rotate in the clockwise direction (see FIG. 5) or counterclockwise direction (see FIG. 7) through the link operation. Rotation force of the core wheel 25 as described above is transferred to the swivel core 10 through the control shaft 20, such that the swivel core 10 rotates, and the cross section of the extrusion nozzle 5 of the second die 2 may be varied by rotation of the swivel core 10 (see FIGS. 6 and 8).

Referring to FIGS. 5 to 8, in certain embodiments, a rotation direction of the motor 31 and a rotation direction of the swivel core 10 may be opposite to each other.

Figure 5:
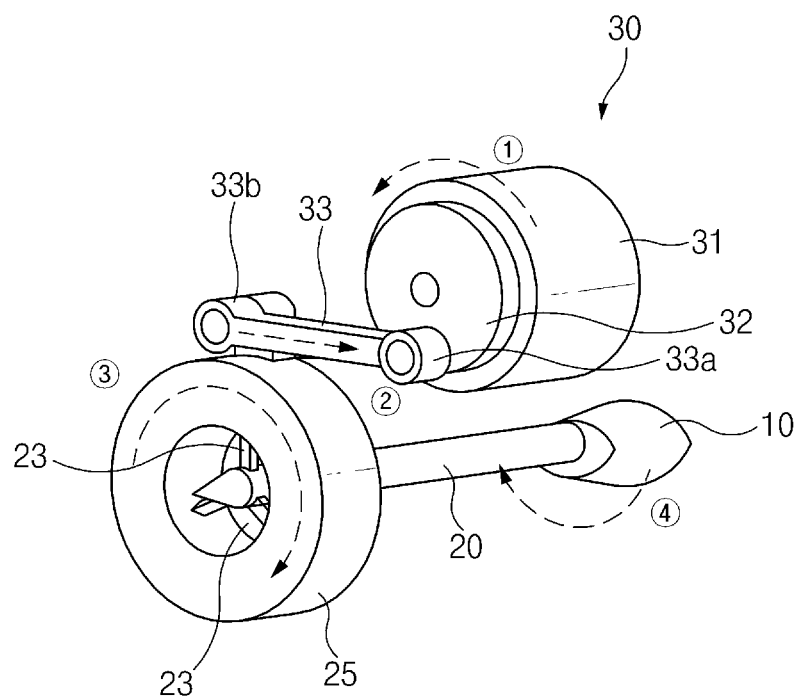
FIG. 5 is a view illustrating a state in which the core wheel and a swivel core of the variable extrusion die apparatus according to an embodiment of the present inventive concept are rotated in a clockwise direction by the controller when viewed in the direction A shown in FIG. 1.

In certain embodiments, when the motor 31 of the controller 30 rotates in the counterclockwise direction as illustrated in FIG. 5, the connecting rod 33 operates, such that the core wheel 25 and the control shaft 20 rotate in the clockwise direction, and the swivel core 10 also rotates in the clockwise direction in interlock with a clockwise rotation of the control shaft 20 as described above. A rotation position of the swivel core 10 in the extrusion nozzle 5 is determined as illustrated in FIG. 6 by the clockwise rotation of the swivel core 10 as described above.

Figure 7:
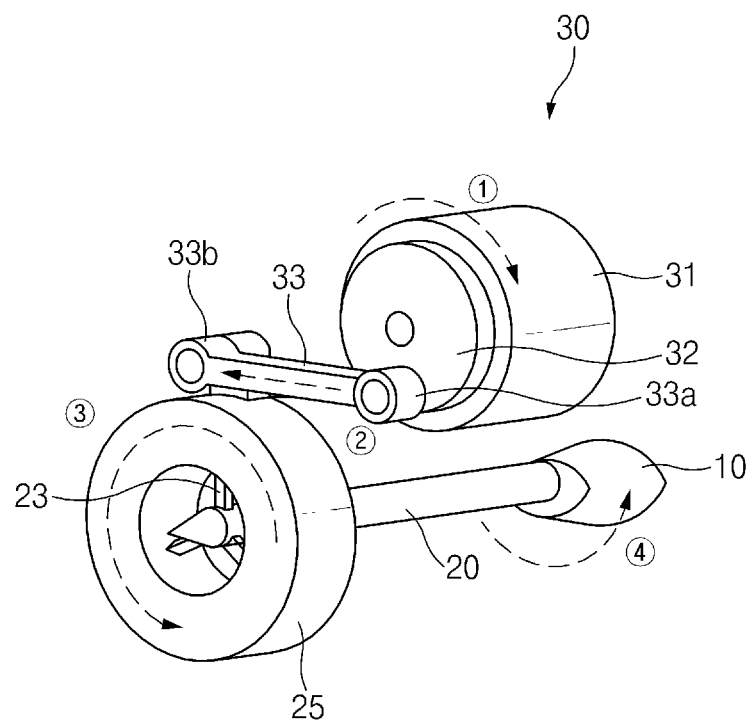
FIG. 7 is a view illustrating a state in which the core wheel and a swivel core of the variable extrusion die apparatus according to an embodiment of the present inventive concept rotate in a counterclockwise direction by the controller when viewed in the direction A shown in FIG. 1.

When the motor 31 of the controller 30 rotates in the clockwise direction as illustrated in FIG. 7, the connecting rod 33 operates, such that the core wheel 25 and the control shaft 20 rotate in the counterclockwise direction, and the swivel core 10 also rotates in the counterclockwise direction in interlock with a counterclockwise rotation of the control shaft 20 as described above. A rotation position of the swivel core 10 in the extrusion nozzle 5 is determined as illustrated in FIG. 8 by the counterclockwise rotation of the swivel core 10 as described above.

Figure 6:
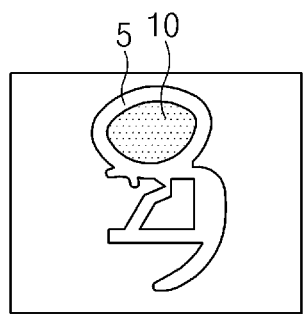
FIG. 6 is a view illustrating a change in a cross section in the extrusion nozzle as the swivel core rotates in the direction shown in FIG. 5.
Figure 8:
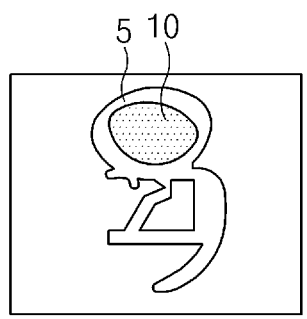
FIG. 8 is a view illustrating a change in a cross section in the extrusion nozzle as the swivel core rotates in the direction shown in FIG. 7.

Meanwhile, in certain embodiments, the swivel core 10 has a cross sectional shape having at least two portions with different curvatures from each other, and a thickness, or the like, of the extrusion nozzle 5 may be partially varied by rotation of the swivel core 10 as illustrated in FIGS. 6 and 8, such that the cross-sectional shape of the extrusion nozzle 5 may be varied. However, in certain embodiments, a cross-sectional area of the extrusion nozzle 5 is the same regardless of rotation of the swivel core 10.

With the variable extrusion die apparatus according to an exemplary embodiment of the present inventive concept as described above, the cross-sectional shape of the extrusion nozzle 5 may be varied, thereby making it possible to mold the extrusion product while variously varying the cross-sectional shape thereof, for example, allowing the extrusion product to have partially different thicknesses, or the like. For example, the extrusion product may be optimized by thinning the thickness at a low reaction force site and thickening the thickness at a high reaction force site such as a door flame, or the like.

Further, according to an embodiment of the present inventive concept in which the cross-sectional area of the extrusion nozzle 5 is not changed at the time of varying the cross section of the extrusion nozzle 5, there is no need to change a flow rate of the extrusion material, such that a separate flow rate adjusting apparatus, a flow rate control device, or the like, is not required. Therefore, the configuration is decreased, such that equipment investment cost is decreased as compared to the existing apparatus. Further, since there is no need to adjust the flow rate depending on the thickness or a flow rate deviation is significantly small, a degree of freedom in designing a variable section is increased. In addition, since the cross-sectional area of the extrusion nozzle 5 is equal, a T/O term is the same as that of the existing die.

As described above, according to an exemplary embodiment of the present inventive concept, the following advantages may be provided.

First, the product having a variable cross section may be more easily extrusion molded by rotating the swivel core in the extrusion nozzle to simply vary the cross section of the extrusion nozzle.

Second, new development and investment may be minimized by maximally maintaining the existing die.

The effects of embodiments of the present inventive concept are not limited to the above-mentioned effects, and other effects that are not mentioned will be clearly understood by those skilled in the art through the accompanying claims.

Although the preferred embodiments of the present inventive concept have been disclosed for illustrative purposes, the present inventive concept is not limited to the above-mentioned exemplary embodiments, but those skilled in the art will appreciate that various modifications, additions and substitutions are possible, without departing from the scope and spirit of the inventive concept as disclosed in the accompanying claims. Accordingly, such modifications, additions and substitutions should also be understood to fall within the scope of the present inventive concept.

What is claimed is:

1. A variable extrusion die apparatus, comprising:
a first die into which an extrusion material is injected;
a second die coupled to the first die and having an extrusion nozzle which has a shape corresponding to a cross section of an extrusion product;
a swivel core installed such that the swivel core is rotatable in the extrusion nozzle; and
a control shaft connecting a core wheel, which is configured to rotate the swivel core, to the swivel core, the control shaft passing through the first die and extending toward the extrusion nozzle of the second die,
wherein a cross section of the extrusion nozzle is varied by rotation of the swivel core, and
wherein the core wheel has a plurality of spokes at an inner peripheral surface of the core wheel, and the control shaft has two opposing ends, one opposing end connected to the inner peripheral surface of the core wheel via the plurality of spokes, and the other opposing end connected to the swivel core.

2. The variable extrusion die apparatus according to claim 1, wherein the swivel core has a cross-sectional shape having at least two portions with different curvatures from each other.

3. The variable extrusion die apparatus according to claim 1, wherein a cross-sectional area of the extrusion nozzle is consistent regardless of rotation of the swivel core.

4. The variable extrusion die apparatus according to claim 1, wherein an axial direction of the swivel core is consistent as an extrusion direction of the extrusion material.

5. The variable extrusion die apparatus according to claim 1, wherein the first die has opposing first and second major surfaces, and
wherein the second die is coupled to the first major surface of the first die, and the core wheel is installed to the second major surface of the first die.

6. The variable extrusion die apparatus according to claim 5, further comprising a controller configured to rotate the core wheel.

7. The variable extrusion die apparatus according to claim 6, wherein the controller comprises a motor configured to generate power, a crank configured to be rotated by the motor, and a connecting rod connecting the crank to the core wheel.

8. The variable extrusion die apparatus according to claim 7, wherein the motor rotates in a first rotation direction and the swivel core rotates in a second rotation direction opposite to the first rotation direction.

9. A variable extrusion die apparatus, comprising:
an extrusion die having an extrusion nozzle having a shape corresponding to a cross section of an extrusion product; and
a swivel core rotatably installed in the extrusion nozzle;
a core wheel rotating the swivel core, wherein the core wheel is rotatable on the extrusion die; and
a control shaft connecting the core wheel to the swivel core, the control shaft passing through the first die and extending toward the extrusion nozzle of the second die,
wherein a cross section of the extrusion nozzle is varied by rotation of the swivel core, and
wherein the core wheel has a plurality of spokes at an inner peripheral surface of the core wheel, and the control shaft has two opposing ends, one opposing end connected to the inner peripheral surface of the core wheel via the plurality of spokes, and the other opposing end connected to the swivel core.

10. The variable extrusion die apparatus according to claim 9, wherein an axial direction of the swivel core is the same as an extrusion direction of an extrusion material.

\* \* \* \* \*